United States Patent [19]

Kleefeldt

[11] Patent Number: 5,829,114
[45] Date of Patent: Nov. 3, 1998

[54] ALIGNING A MOTOR-VEHICLE DOOR

[75] Inventor: Frank Kleefeldt, Heiligenhaus, Germany

[73] Assignee: Kiekert AG, Heiligenhaus, Germany

[21] Appl. No.: 644,850

[22] Filed: May 9, 1996

[30] Foreign Application Priority Data

May 23, 1995 [DE] Germany .......................... 195 18 876.4
Apr. 3, 1996 [DE] Germany .......................... 196 13 299.1

[51] Int. Cl.⁶ .................................................... B60J 1/00
[52] U.S. Cl. ............................................. 29/468; 296/202
[58] Field of Search ................................ 29/468, 407.09, 29/407.1; 296/146.9, 202

[56] References Cited

U.S. PATENT DOCUMENTS

| 4,176,369 | 11/1979 | Nelson . | |
| 4,186,476 | 2/1980 | Mair et al. | 29/407.01 |
| 4,679,290 | 7/1987 | Adell | 29/407.09 |
| 4,861,099 | 8/1989 | Sasamura et al. | 296/202 |
| 5,181,307 | 1/1993 | Kitahama et al. | 29/468 X |
| 5,282,305 | 2/1994 | Nutt et al. | 29/468 |
| 5,564,775 | 10/1996 | Ebert et al. | 296/202 |

FOREIGN PATENT DOCUMENTS

| 3810239 | 10/1988 | Germany . |
| 3842258 | 6/1989 | Germany . |
| 4022811 | 1/1992 | Germany . |
| 4107219 | 9/1992 | Germany . |

*Primary Examiner*—Joseph M. Gorski
*Attorney, Agent, or Firm*—Herbert Dubno; Andrew Wilford

[57] ABSTRACT

A door is aligned in an opening of a motor-vehicle in which is fixed a latch by first mounting in the door opening a keeper having a screw adjuster effective for horizontally displacing the keeper on the vehicle transverse to a normal vehicle travel direction, a bolt engageable with the latch and orbitable about a horizontal axis transverse to the normal vehicle travel direction through an arc having an outer pull-in section and an inner adjustment section, a drive including a motor for orbiting the bolt through its arc, and a controller connected to the motor for operating same. Then the door is carefully closed to engage the latch with the bolt and the door is pulled into the opening by orbiting the bolt by its motor through the outer pull-in section of its arc. The position of the door in the door opening is then first adjusted by orbiting the bolt by its motor through at least a part of the inner adjustment section of its arc until the door is in a predetermined centered position in the opening and the position of the bolt is then recorded in the controller so that thereafter the bolt is returned to this position each time the door is closed. Finally the position of the door is adjusted in the door opening by the screw adjuster.

8 Claims, 3 Drawing Sheets

ALIGNING A MOTOR-VEHICLE DOOR

FIELD OF THE INVENTION

The present invention relates to the alignment of a motor-vehicle door in its frame. More particularly this invention concerns a method of aligning a motor-vehicle door in its frame as well as a latch assembly and system for carrying out the method.

BACKGROUND OF THE INVENTION

In a standard mass-produced motor vehicle the vehicle body and its doors are manufactured at separate locations and the doors are mounted in the body as same travels along an assembly line. Normally the door had a complex shape that fits into a complementarily shaped opening of the body. Hinges along one vertical edge of the door secure it to the body and the opposite edge of the door is provided with a latch engageable with a bolt normally projecting in a normal horizontal direction of travel of the vehicle from the corresponding edge of the door opening.

The latch typically has a fork pivotal about a horizontal axis and set to capture the doorpost bolt when the door is closed. German patent documents 4,022,811 filed 18 Jul. 1990 and 4,107,219 filed 7 March 1991 by U. Kostler describe such latches where the bolt has a pair of ends pivotal about an main axis in the latch and a central section that is centered on an axis parallel to but offset from the main axis. Thus as a motor pivots the bolt about the main axis, the center section that is engaged by the fork is orbited and the door can be pulled tight. The function of this is to allow the door to be shut lightly, after which the motor pulls it very tight.

During assembly of the vehicle it is necessary to align the door in the opening of the vehicle body, as even with the most careful production the door is unlikely to fit perfectly. This is typically done by shimming the hinges and/or by providing the hinges and door latch with slots through which mounting bolts extend so these elements can be shifted on the door and vehicle body. Thus the door is mounted on the hinges and then closed so that the spacing around the edge of the door can be observed. Then shims are inserted at the hinges to raise, lower, and/or horizontally shift the door to make the spacing uniform. This operation requires a skilled operator and even so is a time-consuming procedure. Once the vertical position of the door as well as its horizontal position parallel to the travel direction are set, the latch and/or bolt are shifted to ensure that the door sits flush to the opening, necessitating another adjustment operation that is also invariably carried out by hand.

OBJECTS OF THE INVENTION

It is therefore an object of the present invention to provide an improved system for aligning a motor-vehicle door in a door opening.

Another object is the provision of such an improved system for aligning a motor-vehicle door in a door opening which overcomes the above-given disadvantages, that is which is relatively simple.

A further object is to provide an improved method of aligning a door in a car-body door opening that is particularly adapted to computerized robotics assembly-line production.

SUMMARY OF THE INVENTION

A door is aligned in an opening of a motor-vehicle in which is fixed a latch by first mounting in the door opening a keeper having a screw adjuster effective for horizontally displacing the keeper on the vehicle transverse to a normal vehicle travel direction, a bolt engageable with the latch and orbitable about a horizontal axis transverse to the normal vehicle travel direction through an arc having an outer pull-in section and an inner adjustment section, a drive including a motor for orbiting the bolt through its arc, and a controller connected to the motor for operating same. Then the door is carefully closed to engage the latch with the bolt and the door is pulled into the opening by orbiting the bolt by its motor through the outer pull-in section of its arc. The position of the door in the door opening is then first adjusted by orbiting the bolt by its motor through at least a part of the inner adjustment section of its arc until the door is in a predetermined centered position in the opening and the position of the bolt is then recorded in the controller so that thereafter the bolt is returned to this position each time the door is closed. Finally the position of the door is adjusted in the door opening by the screw adjuster.

With this system, therefore, the existing power latch is provided to align the door. Since the eccentric door bolt is pivotal about a horizontal axis extending front-to-back, that is in the travel direction, as it orbits it inherently moves the respective edge of the door both vertically and horizontally transverse to the travel direction. Thus this power-latching feature is exploited to shift the door into the desired center position and this position is recorded so that when the door is subsequently shut this position can be returned to. The adjustment in the other direction, that is horizontally and transverse to the travel direction, is set manually once the vertical position is determined so that the door will always be returned to a perfectly centered and flush position.

Thus the operator shuts the door and the latch's controller steps the drive motor until the door is properly centered, whereupon the position is recorded. Then the horizontal setting of the door in the opening transverse to the travel direction is observed or read by a computer. The door is opened and the screw adjuster is operated to cancel out any offset from a flush position of the door.

The position of the door in the door opening of the car body can easily be determined by automatic devices of the type described in U.S. Pat. No. 4,176,369 of Nelson. This arrangement can be integrated in to a control system of the types described in German patent documents 3,819;239 filed 25 Mar. 1988 by Kubozone and 3,842,258 filed 15 Dec. 1988 by Abe.

According to the invention the bolt is also orbitable through a connecting section between the outer and inner sections. The door position is adjusted by orbiting the bolt through the connecting section after orbiting it through the outer pull-in section and before orbiting it through the inner adjustment section. Furthermore the bolt has a pair of end sections defining a pivot axis for the bolt in the latch and a center section centered on an axis offset from and parallel to the pivot axis.

The controller according to the invention is provided with a nonvolatile memory for registering the position of the bolt and the drive includes a rotary motor connected to the bolt. The controller includes means for determining the position of the door in the door opening. This can be incorporated in the control systems cited above and with a robot for operating the screw adjuster to entirely automate the procedure of setting the door.

The screw adjuster includes a screw rotatable in the latch and extending in the travel direction, a nut threaded on the screw, and a lever extending at an angle to the travel direction and having one end braced against the nut and an opposite end braced against a motor-vehicle body formed with the opening.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
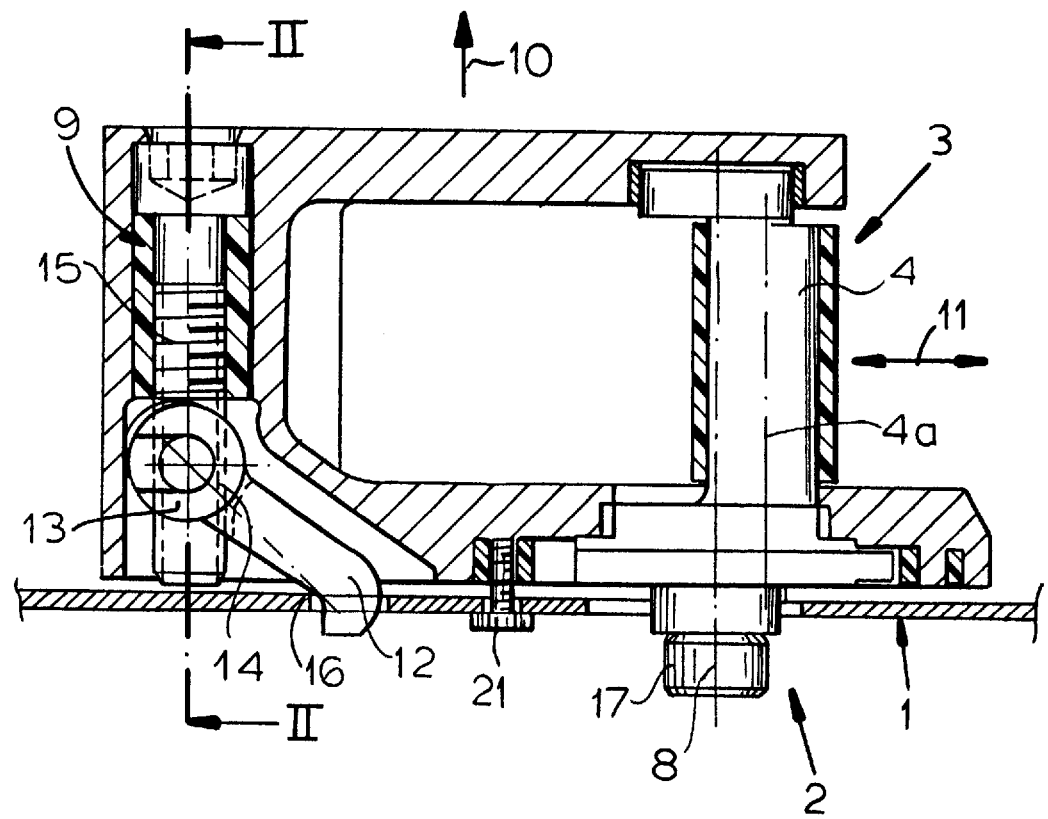
FIG. 1 is a section through the lock keeper of this invention.
Figure 2:
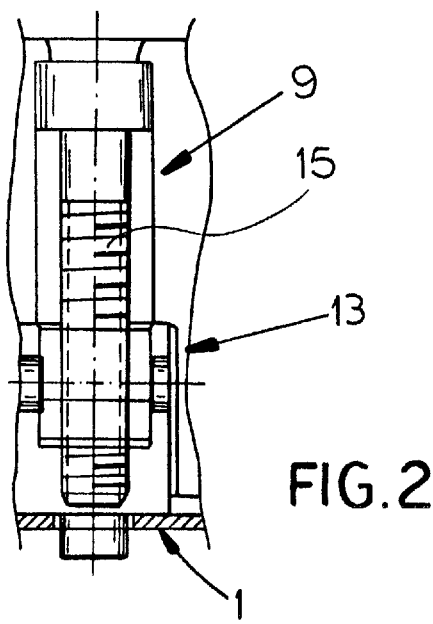
FIG. 2 is a section taken along line II—II of FIG. 1.
Figure 3:
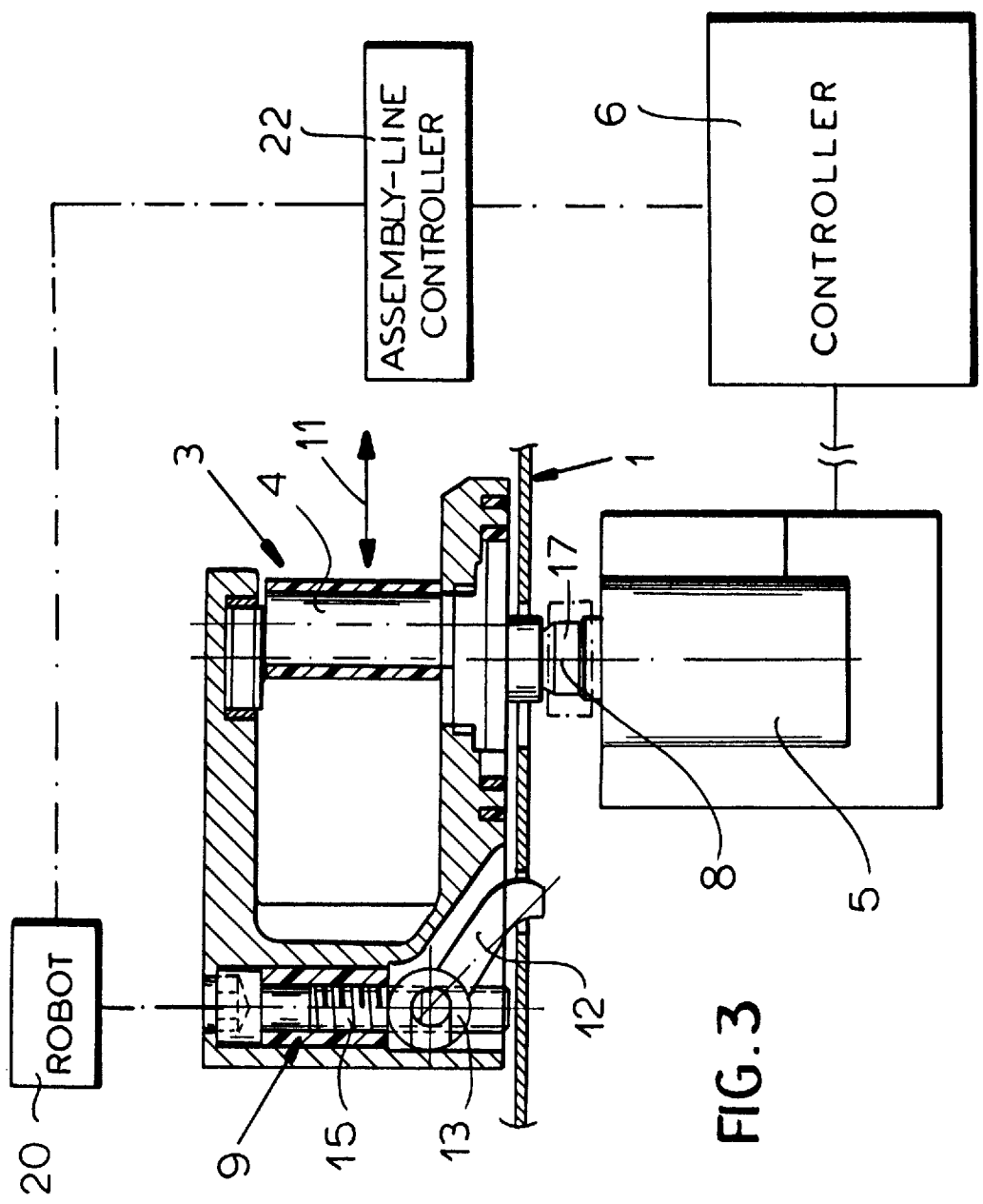
FIG. 3 is a smaller scale and partly diagrammatic view of the lock keeper of FIG. 1.
Figure 4:
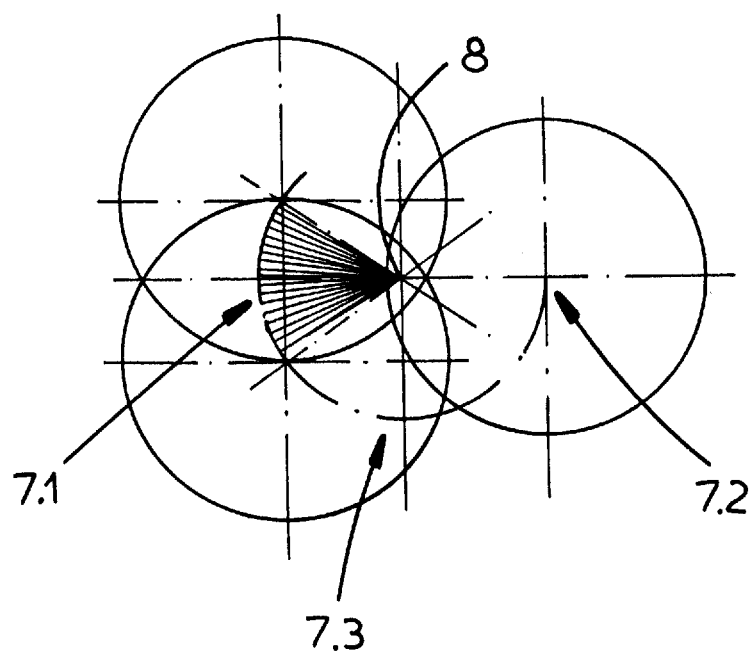
FIG. 4 is a diagrammatic view illustrating how the keeper works.
Figure 5:
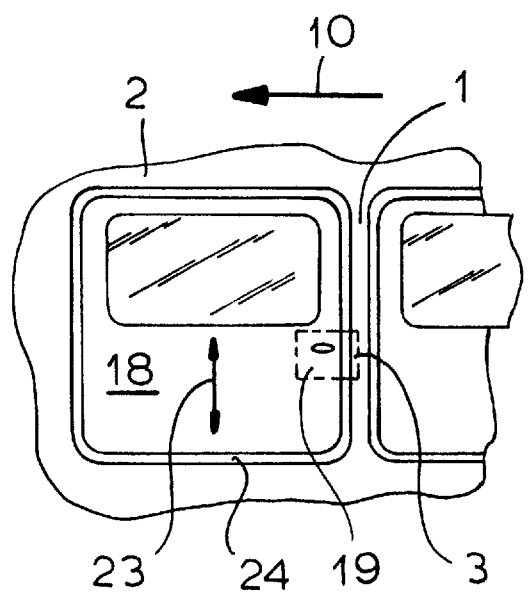
FIG. 5 is a small-scale view of a vehicle door with the alignment system of this invention.

As seen in FIGS. 1 and 5 a motor-vehicle body 2 has a door opening 24 partially defined by a door post 1 against which a door 18 carrying a standard latch 19 closes. A keeper unit 3 in the door frame has a bolt 4 pivotal via a coupling 17 by a motor 5 controlled by a controller 6 about a horizontal axis 8 offset from the axis 4A of the bolt 4 and parallel to a normal direction 10 of travel of the vehicle. The motor 5 can move the bolt 4 angularly through a tightening stroke 7.1 (FIG. 4), through an adjustment stroke 7.2 described below, and through a connecting stroke 7.3. The latch 19 is of conventional construction, fixed in the door 18 and having an unillustrated pivotal fork that engages snugly around the bolt 4 to secure the door 18 tightly to the vehicle body 2 in a fixed vertical position relative to the horizontally extending bolt 4.

In addition the keeper 3 is provided with an adjuster 9 that can move this keeper 3 in a horizontal direction 11 (y coordinate) perpendicular to the vehicle travel direction 10 (x coordinate) on the door post 1, normally perpendicular to a vertical plane of the door 18. This adjuster 9 comprises a lever 12 with a head 13 having a screwthread 14 into which is threaded a bolt 15 extending in the direction 10. The end of the lever 12 is engaged in a hole 16 in the post 1 so as to be braced outward against the body 2. Bolts such as shown at 21 secure the keeper 3 to the door post 1. So long as the bolts 21 are not too tight, rotation of the bolt 15 can move the head 13 outward toward the door post 1 to push the keeper 3 in the direction 11 toward the interior of the vehicle. The normal seals around the door 18 effectively bias the door 18 outward.

As is standard the door latch 19 is fixed to the door 18 which is mounted in the door opening 24 of the vehicle body 2. The keeper 3 is mounted on the post 1 by means of the screws 21 which are not tightened fully. The door 18 is carefully shut, the controller 6 is operated by the controller 22 to orbit the bolt 4 through its pull-in stroke 7.1, and the appropriate measurements are made by this controller 22 or by a machine operator.

Then the motor 5 is stepped through the adjustment stroke 7.2 sufficiently to create a uniform spacing at the door-post 1 and at the upper door edge. The number of steps necessary along stroke 7.2 to achieve this alignment is recorded permanently in a nonvolatile memory of the controller 6 so that with subsequent closings of the door 18 it can be repeated. Further measurements are taken to determine the setting of the door 18 in the opening 24, that is whether it is flush, recessed, or projecting at the latch side.

Subsequently the door 18 is opened and a robot 20 connected via the assembly-line controller 22 to the lock controller 6 engages the bolt 15 and rotates it to move the keeper 3 in the direction 11 so that when the door 18 is shut it is perfectly aligned in the direction 11, flush in the opening 24. Once this is done the bolts 21 are torqued down to lock the keeper 3 in position.

I claim:

1. A method of aligning a door relative to a door opening of a motor vehicle wherein the door is provided with a latch having a latching fork, the opening is defined on one side by a door post provided with a keeper in turn carrying a bolt centered on a horizontal bolt axis extending in a normal travel direction of the vehicle, the bolt being orbitable about an axis substantially parallel to but offset from the bolt axis, a motor is connected to the bolt for orbiting it about the offset axis, and an electronic control means is connected to the motor for operating it, the method comprising the steps of:

providing between the keeper and the door post a screw adjuster operable to move the keeper in a horizontal direction transverse to the normal travel direction;

initially aligning the door in the opening during installation of the door in the vehicle by sequentially a) moving the door relative to the door opening to engage the locking fork around the bolt, b) while the locking fork is engaged around the bolt, operating the motor through the electronic control means to orbit the bolt through the arc and thereby move the door vertically until a desired vertically centered position of the door in the opening is attained, c) while the locking fork is engaged around the bolt, actuating the screw adjuster to horizontally displace the keeper relative to the door post in the transverse direction to a desired horizontal position, and d) fixing the keeper to the door post in the desired horizontal position; and thereafter each time the door is closed performing only steps a) and b).

2. The door alignment method of claim 1 wherein the bolt is orbitable through a connecting section between an outer pull-in section and an inner adjustment section, the door position being adjusted in step b) by orbiting the bolt through the connecting section after orbiting it through the outer pull-in section and before orbiting it through the inner adjustment section.

3. The door alignment method of claim 1 wherein the bolt has a pair of end sections defining the offset axis and a center section centered on the bolt axis.

4. The door alignment method of claim 1 wherein the control means is provided with a nonvolatile memory for registering the position of the bolt.

5. The door alignment method of claim 1 wherein the control means includes means for determining the position of the door in the door opening.

6. The door alignment method of claim 1 wherein the screw adjuster includes a screw rotatable in the latch and extending in the travel direction, a nut threaded on the screw, and a lever extending at an angle to the travel direction and having one end braced against the nut and an opposite end braced against a motor-vehicle body formed with the opening.

7. The door alignment method of claim 1 wherein the screw actuator is actuated manually.

8. The door alignment method of claim 1 wherein the screw actuator is actuated robotically.

\* \* \* \* \*